United States Patent [19]

Kriechbaum

[11] 4,042,963
[45] Aug. 16, 1977

[54] REDUCTION OF MECHANICAL STRESSES ON TURBOSETS UPON OCCURRENCE OF THREE-POLE MAINS SHORT CIRCUITS NEAR GENERATORS

[75] Inventor: Karl Kriechbaum, Kassel-Ki, Germany

[73] Assignee: Licentia Patent-Verwaltungs-GmbH, Frankfurt am Main, Germany

[21] Appl. No.: 650,757

[22] Filed: Jan. 20, 1976

[30] Foreign Application Priority Data

Jan. 25, 1975 Germany .............................. 2503034

[51] Int. Cl.² .............................................. H02H 7/06
[52] U.S. Cl. ..................................... 361/20; 322/27; 361/58; 361/93
[58] Field of Search ................... 317/20, 21, 16, 11 C, 317/11 A; 307/134, 135, 136; 322/27, 95, 98, 37, 97, 91, DIG. 3; 323/94, 96, 97

[56] References Cited

U.S. PATENT DOCUMENTS

| | | | |
|---|---|---|---|
| 2,316,170 | 4/1943 | Kesselring et al. | 317/11 C |
| 3,366,837 | 1/1968 | Mester | 317/20 X |
| 3,529,210 | 9/1970 | Ito et al. | 317/20 |
| 3,566,152 | 2/1971 | Casey et al. | 317/11 A X |
| 3,590,319 | 6/1971 | Baltensperger | 317/20 X |
| 3,873,887 | 3/1975 | Barkan et al. | 317/20 |
| 3,935,509 | 1/1976 | Eidinger | 307/136 X |

Primary Examiner—J D Miller
Assistant Examiner—Patrick R. Salce
Attorney, Agent, or Firm—Spencer & Kaye

[57] ABSTRACT

A method and apparatus for reducing the mechanical stresses on the shaft of a turboset and on the shaft of the generator coupled thereto upon the occurrence of a three-pole mains short circuit near the generator and upon the subsequent elimination of the three-pole short circuit. A generator switch is connected between the output of the generator and the mains, and a resistor, whose size is adapted to the size of the load on the generator, is connected in parallel with the generator switch. The generator switch is opened upon the occurrence of a short circuit to switch the resistor into the load circuit of the generator and the resistor is again bridged when the short circuit is switched off of the mains.

6 Claims, 1 Drawing Figure

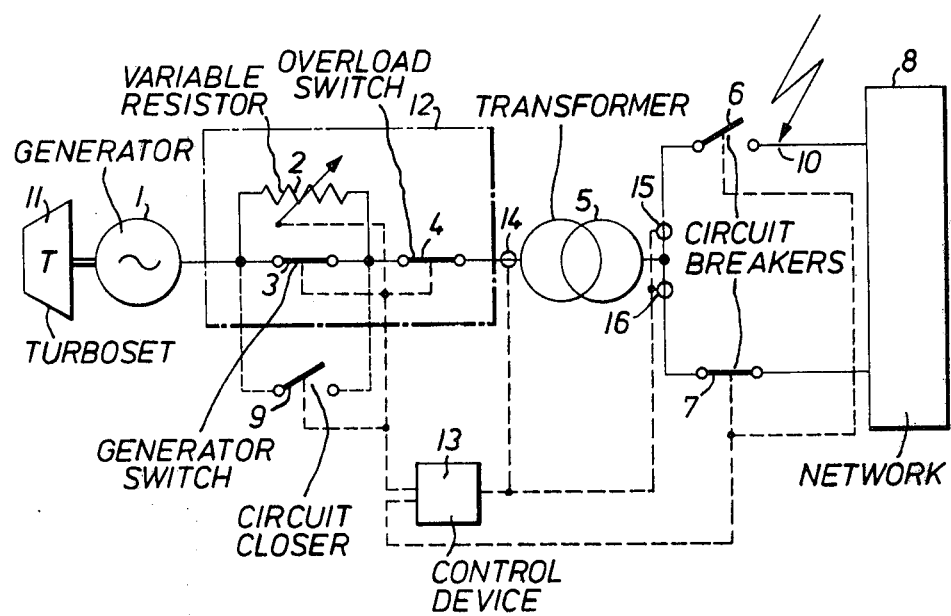

REDUCTION OF MECHANICAL STRESSES ON TURBOSETS UPON OCCURRENCE OF THREE-POLE MAINS SHORT CIRCUITS NEAR GENERATORS

BACKGROUND OF THE INVENTION

The present invention relates to a method and apparatus for reducing mechanical stresses on the shaft of turbosets and on the generator shaft coupled thereto upon the occurrence of three-pole mains short circuits near the generators and upon the elimination of such short circuits.

Examination of the influence of short circuits in the vicinity of a power plant on the mechanical stresses on the shafts of turbosets has shown that three-pole mains short circuits near the generator and their elimination with simultaneous return of the full line voltage may lead to very high mechanical stresses on the shafts. These stresses excede by a multiple those of a two-pole short circuit — a case of stress for which the shafts are designed (ETZ-A, vol. 95 (1974), pages 508–514). The reasons for this stress are the following circumstances:

When a short circuit occurs near the generator, that means within a range of about 1 km from the power station, the load is removed from the generator and assuming that the short circuit does not create an arc, an inductive short circuit current with low losses flows. On the other hand, collapse of the voltage removes the synchronizing moment with the result that the generator is accelerated by the initially still unthrottled turbine, causing the load angle to increase under these conditions the machine would become asynchronous if the short circuit were not eliminated very quickly, i.e., within about 200 ms. The mechanical stresses on the shaft of the turboset occurring during the short circuit are relatively low. If the short circuit is now switched off by one of the circuit breakers on the high voltage side, then the phase shifted line voltage of the network 8 reappears at the generator and a synchronizing moment is developed. Depending on the mechanical starting conditions at the moment of return of the voltage, this moment leads to transient mechanical oscillations at relatively high amplitude.

In order to attempt to avoid these large amplitude oscillations the above-mentioned publication proposes that the short circuit not be simultaneously switched in all three poles but to initially switch off only one pole. Thus the three-pole short circuit would be converted to a two-pole short circuit and thereafter, with an offset of a defined period of time, the other two poles would be switched off. This will considerably reduce the mechanical stresses. However, the mechanical stresses still lie above the stresses for which the shaft was designed.

SUMMARY OF THE INVENTION

It is the object of the present invention to provide a method and apparatus which leads to a reduction of the mechanical stresses on the shafts of turbosets and on the shaft of the generator coupled thereto upon the occurrence of a three-pole mains short circuit near the generator and upon their elimination of such short circuit.

This is accomplished according to the present invention in that a generator switch is connected between the output of the generator and the mains, and a resistor, whose size is adapted to the normal load on the generator, is connected in parallel with the generator switch. In the case of a short circuit, the generator switch is opened and thus switches the resistor into the load circuit of the generator. After the short circuit is switched off, by means of a switch provided later on in the mains, the resistor is bridged, i.e., short circuited, again.

BRIEF DESCRIPTION OF THE DRAWINGS

The FIGURE is a schematic diagram of an arrangement according to the invention.

DETAILED DESCRIPTION OF THE PREFERRED EMBODIMENTS

Referring now to the FIGURE, there is shown an electrical generator 1 whose shaft is coupled to the output shaft of a set of turbines 11. The electrical output of generator 1 is connected via a transformer 5 and circuit breakers 6 and 7 to a network 8. According to the invention a generator switch 3, having a resistor 2 in parallel therewith is connected between the electrical output of the generator 1 and the primary of the transformer 5. Preferably a switch 4, which serves to protect the resistor 2 against overloads, is connected in series with the switch 3, which is preferably a very fast-acting switch which opens when a short circuit occurs. As switch 3, a very fast acting circuitbreaker as described in the U.S. Pat. No. 3,604,871 can be used.

The resistor 2 is, as illustrated, preferably a variable resistor and is dimensioned so that it corresponds to the normal load resistance on the generator before the occurrence of a short circuit.

When a short circuit in the mains e.g. at the point 10, occurs, the very fastacting generator switch 3, which has the resistor 2 connected in parallel therewith, is opened, causing the resistor 2 to be switched into the load circuit of the generator 1. Since this resistor 2 is dimensioned so that it corresponds to the load resistance on the generator 1 before the occurrence of a short circuit in the mains, the dangerous effect of the short circuit, when seen from the generator 1, is eliminated. The generator 1 will not be accelerated by the turbine 11 and thus the phase angle between generator 1 and network 8 will not spread. Now the short circuit can be selectively interrupted by the breaker 6 and a second, not shown breaker in the network 8. This, however, would reduce the load on the generator 1 and the generator 1 would be accelerated by the turboset 11. This is prevented by again closing the generator switch 3 and thus bridging the parallel resistor 2. This then reinstates the original conditions. The mechanical stresses on the shafts of the turboset 11 and the generator 1 in such a case will not exceed the stresses of a two-pole short circuit.

The parallel resistor 2 may be a stepping resistor whose size in each case is adapted to the respective load state of the generator 1. It is possible to make do with but a single resistance value if, for example, a resistor is provided whose resistance corresponds to 80% of the load resistance value on the generator 1 and the arrangement 12 according to the present invention, becomes effective only if a certain load is exceeded.

Bridging of the resistor 2 upon removal of a short circuit can also be effected, instead of by means of closing the generator switch 3, by a separate circuit closer 9 connected in parallel with the generator switch 3.

The important thing is that the generator switch 3 acts quickly so that vibrations of the generator shaft under the influence of the short circuit are prevented if possible. This has the result that no special requirements regarding speed have to be met by the circuit breakers 6 and 7 on the high voltage side, they can be actuated or tripped at three poles and the stresses on the shaft which develop are independent of the moment of actuation.

The switch 4 connected in series with the generator switch 3 and the parallel resistor 2 serves to selectively interrupt the resistor current. With this additional switch 4 the resistor 2 can be protected against overloads in case the circuit breaker on the high voltage side does not act in time or a short circuit occurs between the arrangement 12 and the circuit breakers 6,7.

The present invention achieves a reduction in stresses not only for the case of the three-pole short circuit but also for faulty synchronizations and for two-pole short circuits in the case where the generator switch 3 is a very fast-acting switch, i.e., a single period switch.

In order to coordinate the operation of the different switches in case of a short circuit, a control device 13 is foreseen. This device is connected to the switches 3,4,6,7,9, to the variable resistor 2, and to the current-transformers 14,15,16. If a generator-near fault occurs on the line between the circuit breakers 6,7 and the network 8, for instance at the point 10, then a short circuit current is measured by the current transformers 14,15,16. The signals of the current transformers are led to the control device 13, which causes the operation of the switches in the predescribed way.

Under normal working conditions, the resistor 2 is adjusted by the control device 13 in dependance of the load current measured by the current transformer 14.

As control device 13, an over current relay as described in "Technische Mitteilungen AEG-TELEFUNKEN, 59 (1969) S. 388 – 392" can be used.

It will be understood that the above description of the present invention is susceptible to various modifications, changes and adaptations, and the same are intended to be comprehended within the meaning and range of equivalents of the appended claims.

What is claimed is:

1. A method for reducing mechanical stresses on the shaft of turbosets and on the shaft of the generator coupled to the shaft of the turboset upon the occurrence of a three-pole mains short circuit near the generator and upon the subsequent elimination of the short circuit, comprising the steps of: providing a normally closed generator switch having a parallelly connected resistor, which has a size equal to approximately 80% of the full load value for the generator, between the output of the generator and the mains; opening the generator switch upon the occurrence of a short circuit to switch the resistor into the load circuit of the generator; and bridging the resistor when the short circuit is switched off of the mains by a switch provided later on in the mains.

2. A method as defined in claim 1 wherein said step of bridging comprises closing said generator switch.

3. An arrangement for practicing the method defined in claim 1 wherein the generator switch is designed as a switch which has a very short total switch-off time, particularly as a singleperiod switch.

4. In a power distribution system including a three-pole mains, an electrical generator having its output connected to said main and a turboset having its output shaft coupled to the shaft of said generator for driving same, the improvement comprising means for reducing the mechanical stresses on said turboset shaft and said generator shaft upon the occurrence of a three-pole short circuit in said main near said generator, said means including: a normally closed switch connected between the output of said generator and said mains; a fixed resistor, whose value is approximately 80% of the full load value of said generator, connected in parallel with said switch; means for opening said switch upon the occurrence of a short circuit in said mains to switch said resistor into the load circuit of said generator; and means for again causing said resistor to be bridged when the short circuit is removed from said mains.

5. In a power distribution system including a three-pole mains, an electrical generator having its output connected to said main and a turboset having its output shaft coupled to the shaft of said generator for driving same, the improvement comprising means for reducing the mechanical stresses on said turboset shaft and said generator shaft upon the occurrence of a three-pole short circuit in said mains near said generator, said means including: a normally closed switch connected between the output of said generator and said mains; a resistor connected in parallel with said switch the size of said resistor being adapted to the size of the load on said generator; means for opening said switch upon the occurrence of a short circuit in said mains to switch said resistor into the load circuit of said generator; and means for again causing said resistor to be bridged when the short circuit is removed from said mains, said means for again causing said resistor to be bridged including a circuit closer connected in parallel with said generator switch.

6. An arrangement as defined in claim 5 wherein said resistor is a stepping resistor.

* * * * *